(12) United States Patent
Amino et al.

(10) Patent No.: US 7,919,558 B2
(45) Date of Patent: Apr. 5, 2011

(54) RUBBER COMPOSITION AND PNEUMATIC TIRE USING THE SAME

(75) Inventors: Naoya Amino, Hiratsuka (JP); Misao Hiza, Hiratsuka (JP); Takashi Shirokawa, Hiratsuka (JP); Masao Nakamura, Kawasaki-ku (JP); Koichi Endo, Kawasaki-ku (JP)

(73) Assignees: The Yokohama Rubber Co., Ltd., Tokyo (JP); Zeon Corporation, Tokyo (JP)

( * ) Notice: Subject to any disclaimer, the term of this patent is extended or adjusted under 35 U.S.C. 154(b) by 0 days.

(21) Appl. No.: 10/590,800

(22) PCT Filed: Feb. 22, 2005

(86) PCT No.: PCT/JP2005/003252
§ 371 (c)(1),
(2), (4) Date: Aug. 25, 2006

(87) PCT Pub. No.: WO2005/082995
PCT Pub. Date: Sep. 9, 2005

(65) Prior Publication Data
US 2007/0167555 A1  Jul. 19, 2007

(30) Foreign Application Priority Data

Feb. 27, 2004 (JP) ................. 2004-054279
Feb. 27, 2004 (JP) ................. 2004-054342
Feb. 27, 2004 (JP) ................. 2004-054370
Feb. 27, 2004 (JP) ................. 2004-054372
Feb. 27, 2004 (JP) ................. 2004-054727

(51) Int. Cl.
*B60C 1/00* (2006.01)
*C08L 9/00* (2006.01)
*C08K 3/04* (2006.01)

(52) U.S. Cl. ...................... 524/571; 524/495
(58) Field of Classification Search .............. 524/495, 524/571
See application file for complete search history.

(56) References Cited

U.S. PATENT DOCUMENTS 6,207,757 B1  3/2001  Obrecht et al.
6,242,534 B1  6/2001  Obrecht et al.
6,403,720 B1 * 6/2002  Chino et al. ............. 525/191
2001/0051685 A1  12/2001  Obrecht et al.
2003/0139523 A1 * 7/2003  Nakamura et al. ........ 524/571
2003/0220437 A1 * 11/2003  Hopkins et al. .......... 524/492

FOREIGN PATENT DOCUMENTS

| EP | 1245630 A1 | 10/2002 |
|---|---|---|
| EP | 1291369 A1 | 3/2003 |
| JP | 5-178011 A | 7/1993 |
| JP | 9-150606 A | 6/1997 |
| JP | 9-176384 A | 7/1997 |
| JP | 9-227720 A | 9/1997 |
| JP | 10204217 A | 8/1998 |
| JP | 2000072920 A | 3/2000 |
| JP | 2000072921 A | 3/2000 |
| JP | 2000086825 A | 3/2000 |
| JP | 2001031798 A | 2/2001 |
| JP | 2001089606 A | 4/2001 |
| JP | 2001139729 A | 5/2001 |
| JP | 2001187841 A | 7/2001 |
| JP | 2001354807 A | 12/2001 |
| JP | 2002060437 A | 2/2002 |
| WO | WO-02/00779 A1 | 1/2002 |
| WO | WO 02/10273 A1 | 2/2002 |

* cited by examiner

*Primary Examiner* — Mark Eashoo
*Assistant Examiner* — Angela C Scott
(74) *Attorney, Agent, or Firm* — Connolly Bove Lodge & Hutz LLP

(57) ABSTRACT

A rubber composition containing (i) a conjugated diene-based rubber gel having a toluene swelling index of 16 to 70, (ii) a diene-based rubber such as natural rubber, polyisoprene rubber, aromatic vinyl-conjugated diene copolymer rubber and/or polybutadiene rubber, and (iii) an optional carbon black and/or silica and (a) a pneumatic tire using this composition as a high hardness reinforcing layer extending from a bead along a tire sidewalls, in which the fluidity and dimensional stability at the time of extrusion are improved, while maintaining a sufficient hardness of a high hardness reinforced rubber, (b) a pneumatic tire using this composition as two ends of a tire tread extrudate, maintaining a flex fatigue of the two ends of the tread, in which the extrudability and extrusion dimensional stability are improved and (c) a pneumatic tire using the composition as a 1.5 mm to 6 mm thick undertread, in which a high elasticity and relatively thick gauge undertread, and excellent processability and steering stability are provided.

4 Claims, No Drawings

RUBBER COMPOSITION AND PNEUMATIC TIRE USING THE SAME

This application is a National Stage of PCT/JP2005/003252 filed Feb. 22, 2005 which in turn claims priority from Japanese Applications 2004-054279 filed Feb. 27, 2004; 2004-054342 filed Feb. 27, 2004; 2004-054370 filed Feb. 27, 2004; 2004-054372 filed Feb. 27, 2004 and 2004-054727 filed Feb. 27, 2004.

TECHNICAL FIELD

The present invention relates to a rubber composition and a pneumatic tire using the same, more specifically, it relates to (a) a pneumatic tire, while maintaining flex fatigue of a high hardness reinforcing layer extending from a bead along the tire sidewalls, having improved extrusion fluidity and extrusion dimensional stability at the time of production, (b) a pneumatic tire having improved extrudability and extrusion dimensional stability at the two ends of the tread, (c) a tire tread rubber composition having extremely high wet performance and high wet performance and excellent abrasion resistance, (d) a tire tread rubber composition free from problems in processability at the time of extrusion, even if increasing the compounding ratio, the silica filler for achieving both wet performance and low fuel consumption, and (e). a pneumatic tire having excellent steering stability, provided with an undertread having a high modulus, relatively thick gauge and good processability, all by compounding a conjugated diene copolymer rubber having a toluene swelling index of 16 to 70.

BACKGROUND ART

To improve the rigidity (or stiffness) of a tire, usually a high hardness reinforcing rubber (bead filler) extending from the bead along the tire sidewalls is provided at the inside of the sidewalls. In this conventional high hardness rubber composition, since the unvulcanized viscosity is high, sometimes the temperature rise at the time of extrusion is large, flaws, scorching, and other problems are caused, and the tire shaping precision in the later steps is degraded.

To further improve the good processability, high scorch resistance, etc. of high hardness rubber, the technology has been proposed in that particles of polybutadiene rubber having a glass transition temperature of −60° C. (specifically, the rubber gel having a toluene swelling index of 1 to 50) into a rubber having a double bond (specifically, natural rubber (NR), styrene-butadiene copolymer rubber (SBR), polybutadiene rubber (BR), etc.) (Japanese Patent Publication No. 2001-354807A). This Publication discloses that the die swell decreases due to this compounding. However, polybutadiene rubber gel particles are insufficient for the object of the present invention.

Further, as the basis for the present invention, Japanese Patent Publication No. 2002-60437A discloses a novel conjugated diene-based rubber gel having a toluene swelling index of 16 to 70 and a rubber composition obtained by compounding this rubber gel into a rubber cross-linkable with sulfur and exhibiting an excellent abrasion resistance and low heat buildup property, while maintaining good mechanical properties. However, this prior basic invention does not propose technology for compounding the rubber gel into a diene-based rubber along with a specific amount of carbon black to improve the fluidity and dimensional stability in the high hardness reinforcing layer of the bead filler at the time of extrusion and further does not propose technology for compounding this rubber gel into a diene-based rubber together with a specific amount of polybutadiene rubber containing a cis 1,4-structure in 90% by weight or more to improve the extrudability and dimensional stability at the two ends of the tread extrudate.

Further, International Publication WO 02/000779 discloses a rubber composition having a good processability containing cross-linked rubber particles, having a small rolling resistance and having an excellent wet skid resistance and good abrasion resistance and tensile strength etc. However, the cross-linked rubber particles of the prior invention are obtained by a high polymerization conversion rate, and therefore, there are the problems that there are many toluene insolubles, sufficient mechanical properties cannot be obtained, the flex fatigue deteriorates, and the improvement in the abrasion resistance is insufficient.

A tire tread is usually manufactured by extrusion, but there are the problems that, at the time of extrusion, the tread ends often crack and the tire shaping precision deteriorates in the later steps. To improve this extrudability, the technique of compounding fine crystals of 1,2-syndiotatic polybutadiene etc. is known, but when used for parts with large deformation such as the tread ends or sides, the durability often became a problem.

Further, Japanese Patent Publication No. 10-204217A discloses the use of a rubber composition obtained by compounding an SBR rubber gel (toluene swelling index: 1 to 15) into a diene-based rubber for a tire tread. However, an SBR rubber compounded into this rubber composition has a low toluene swelling index of 1 to 15, that is, has a high degree of gelation, and therefore, differs from that used in the present invention and differs in purpose of compounding as well.

Further, Japanese Patent Publication No. 2001-139729A discloses using a diene-based rubber composition containing a gelled rubber (toluene swelling index: 16 to 150) for a tire excellent in wet performance and low rolling resistance. However, this invention does not disclose using this gelled rubber together with polybutadiene containing at least 90% by weight of a cis 1,4-structure and arranging the rubber composition at the two ends of the tread.

To achieve both wet performance and low fuel consumption of a tire tread rubber containing silica is widely used. In general, the effect becomes greater the larger the ratio of compounding of silica with respect to carbon black. However, tread rubber, in which a large amount of silica is compounded, has a large die swell, and therefore, the processability at the time of extrusion often becomes a problem. There is prior art for compounding gelled rubber to achieve both a good wet performance and low fuel consumption of the tire. The performance of a rubber composition, in which this gelled rubber is compounded, is governed by the toluene swelling index (Q)—an indicator of gel hardness. As disclosed in the above Japanese Patent Publication No. 10-204217A, when Q is 15 or less, the rubber gel is sufficiently hard and the properties as rubber are almost entirely lost, and therefore, the gel can be compounded as a filler. However, a rubber gel filler having a Q of 15 or less is inferior in mechanical properties compared with the generally used carbon, silica, or other rubber reinforcing agents, and therefore, a further additive is required for practical use (see, for example, Japanese Patent Publication No. 2000-72920A, Japanese Patent Publication No. 2000-72921A, Japanese Patent Publication No. 2000-86825A, Japanese Patent Publication No. 2001-31798A, Japanese Patent Publication No. 2001-89606A, and Japanese Patent Publication No. 2001-187841A). This gives rise to new problems in processability, cost, etc., and therefore, still cannot be said to be sufficient technology. Further, Japanese Patent Publication No. 10-204217A does not disclose using the rubber gel so as to reduce the die swell of a rubber composition containing silica and to increase the compounding ratio of the silica filler.

On the other hand, rubber gel having a toluene swelling index (Q) of 16 or more has performance as rubber and, as seen in Japanese Patent Publication No. 2001-139729A, Japanese Patent Publication No. 2001-354807A, etc., selection of a rubber gel having a suitable glass transition temperature Tg enables tire performance to be improved relatively easily, but rubber gel does not take in any filler, and therefore, if a large amount of filler is compounded, extra mixing time is taken, and therefore, the productivity becomes deteriorating. Therefore, by just compounding a rubber gel, a large improvement in performance cannot be expected. Further, rubber gel having a Q of 16 or more improves the wet performance and fuel consumption, but there is the problem that the abrasion resistance is insufficient for use as a tire tread.

Further, Japanese Patent Publication No. 2001-139729A discloses the use of a diene-based rubber composition into which a gelled rubber (toluene swelling index: 16 to 150) is compounded for a tire excellent in wet performance and rollability. However, this prior invention does not teach the use of this rubber in relation with the ratio of compounding of the silica filler.

Further, the cross-linked rubber particles disclosed in International Publication WO02/000779 contain a large amount of toluene insolubles. In a rubber composition having a high compounding ratio of a silica filler, the problem of processability at the time of extrusion cannot be said to be sufficiently resolved and further the balance between the wet performance and the low fuel consumption cannot be said to be sufficient.

To improve the braking performance, to improve the steering stability and to lower the fuel consumption, the general practice is to use a high modulus, relatively thick gauge undertread (see, for example, Japanese Patent Publication No. 5-178011A, Japanese Patent Publication No. 9-176384A, Japanese Patent Publication No. 9-227720A, and Japanese Patent Publication No. 9-150606A). However, if making the undertread high in modulus and thick in the gauge, a problem arises in processability. For obtaining a high modulus, in general, for example, a large amount of small particle size carbon black is compounded. As a result, the viscosity at an unvulcanization stage is high and the heat buildup at the time of extrusion becomes greater, and therefore, scorching easily occurs during the extrusion. Further, if making the gauge thicker, the heat buildup at the time of extrusion becomes greater, and therefore, again scorching easily occurs. Further, if the viscosity is high, the die swell during the extrusion also becomes high and the extrudate easily shrinks.

Further, Japanese Patent Publication No. 2002-60437A discloses a conjugated diene-based rubber gel having a toluene swelling index of 16 to 70 and compounding this rubber gel into a sulfur-cross-linkable rubber to obtain a rubber composition having good mechanical properties and exhibiting excellent abrasion resistance and a low heat buildup property, but does not disclose the technology for improving the fluidity and dimensional stability at the time of extrusion of high hardness reinforced rubber and the extrudability of the rubber at the two ends of the tread and the undertread.

DISCLOSURE OF THE INVENTION

The object of the first aspect of the present invention is to provide a pneumatic tire, while maintaining the sufficient hardness and flex fatigue property of a high hardness reinforcing rubber of a high hardness reinforcing layer extending from a bead along the tire sidewalls having the greatly improved fluidity and dimensional stability at the time of extrusion and a rubber composition to be used for the same.

The object of the second aspect of the present invention is to provide a pneumatic tire, while maintaining the flex fatigue at the two ends of a tread provided at a pneumatic tire, having the improved extrudability and extrusion dimensional stability and a rubber composition to be used for the same.

The object of the third aspect of the present invention is to provide a tire tread rubber composition into which a specific rubber gel is selectively compounded to maintain the high wet performance and further the high wet performance, having the improved abrasion resistance and a pneumatic tire using the same.

The object of the fourth aspect of the present invention is to provide a tire tread rubber composition having excellent processability at the time of extrusion and, even if the compounding ratio of the silica filler in the silica-containing tread rubber is increased, and the excellent wet performance and the low fuel consumption are maintained, and a pneumatic tire using the same.

The object of the fifth aspect of the present invention is to provide a pneumatic tire having the excellent steering stability by eliminating the above problems in the prior art and by providing an undertread having a high modulus and excellent processability in a relatively thick gauge and a rubber composition to be used for the same.

In accordance with the first aspect of the present invention, there are provided a rubber composition comprising 100 parts by weight of a rubber composition containing 30 to 85 parts by weight of natural rubber, 0 to 65 parts by weight of an optional aromatic vinyl-conjugated diene copolymer rubber, and 40 to 5 parts by weight of a conjugated diene-based rubber gel having a toluene swelling index of 16 to 70 and 60 to 120 parts by weight of carbon black, and a pneumatic tire using the same as a high hardness reinforcing layer extending from the bead along the tire sidewalls.

In accordance with the second aspect of the present invention, there are provided a rubber composition comprising 10 to 60 parts by weight of natural rubber, 20 to 75 parts by weight of a polybutadiene rubber containing 90% by weight or more of a cis 1,4-structure, and 40 to 5 parts by weight of a conjugated diene-based rubber gel having a toluene swelling index of 16 to 70, wherein the total amount of rubber is 100 parts by weight, and a pneumatic tire using the same as the two ends of a tire tread extrudate.

In accordance with the third aspect of the present invention, there is provided a tire tread rubber composition comprising 20 to 95 parts by weight of an aromatic vinyl-conjugated diene copolymer rubber (A), 5 to 50 parts by weight of a conjugated diene-based rubber gel (B) having a toluene swelling index of 16 to 70 and 0 to 50 parts by weight of another diene-based rubber (C), wherein the total weight of rubber is 100 parts by weight and wherein the copolymer rubber (A) has a glass transition temperature TgA of −40° C. to −5° C. and wherein the TgA and the TgB of the glass transition temperature of the conjugated diene based rubber gel (B) satisfy the following formula (1):

$$TgA-10<TgB<TgA+10 \quad (1)$$

In accordance with the third aspect of the present invention, there is further provided a tire tread rubber composition, wherein the conjugated diene-based rubber gel satisfies the above conditions and further has a Mooney viscosity, $ML_{1+4}$ (100° C.), of 90 to 140.

In accordance with the fourth aspect of the present invention, there is provided a tire tread rubber composition comprising 50 to 95 parts by weight of a sulfur-vulcanizable rubber mainly composed of an aromatic vinyl-conjugated diene copolymer and 5 to 50 parts by weight of a conjugated diene-based rubber gel having a toluene swelling index Q of 16 to 70, wherein the total weight of the rubber is 100 parts by weight, and 10 to 150 parts by weight of silica and wherein the following formulae (2) and (3) are satisfied:

$$F=(R+S)/(R+T+A) \qquad (2)$$

$$0.6<F\leq 0.9 \qquad (3)$$

wherein F: flexible segment fraction, R: compounding amount of rubber, S: compounding amount of silica, T: total amount of filler including silica, A: extraction amount of acetone)

In accordance with the fifth aspect of the present invention, there is provided a pneumatic tire using a rubber composition containing 50% by weight or more of natural rubber and/or polyisoprene rubber and 5 to 30% by weight of a conjugated diene-based rubber gel having a toluene swelling index of 16 to 70, wherein the total weight of rubber is 100 parts by weight, as a 1.5 mm to 6 mm thick undertread. According to this sixth aspect of the present invention, it is possible to obtain a pneumatic tire having improved processability, by providing a high modulus undertread in a relatively thick gauge, and having excellent steering stability.

BEST MODE FOR CARRYING OUT THE INVENTION

In the description of the present description and claims, the singular form also includes the plural form unless the singular form is clear from the context.

By compounding a conjugated diene-based rubber gel having a toluene swelling index of 16 to 70, preferably 20 to 70, as the conjugated diene-based rubber gel used in the first aspect to fifth aspect of the present invention, the die swell at the time of extrusion is improved (or is reduced), the temperature rise at the time of extrusion is suppressed, and the dimensional stability is improved. If the toluene swelling index is less than 16, the flex fatigue unpreferably decreased. If the toluene swelling index exceeds 70, the effect for improving the processability becomes insufficient. This rubber gel is composed of fine particles having numerous cross-linked points and lacks entanglements with other rubber, and therefore, show good fluidity at the time of extrusion and, as a result, the dimensional stability at the time of extrusion is improved. Further, it has the characteristics that, since it is the same in composition as an ordinary diene-based rubber, it co-cross-links with other rubber and the decrease in the physical properties is small.

The conjugated diene-based rubber gel having a toluene swelling index of 16 to 70 used in the first and second aspect of the present invention is preferably composed of 75 to 99% by weight of conjugated diene monomer units and 25 to 1% by weight of aromatic vinyl monomer units, more preferably is composed of 75 to 98.95% by weight of a conjugated diene monomer unit, 25 to 1% by weight of an aromatic vinyl monomer unit, 0.05 to 1.5% by weight of polyfunctional monomer units and 0 to 20% by weight of optional other ethylenic unsaturated monomer units.

As the monomer usable for forming the conjugated diene monomer units, for example, 1,3-butadiene, 2-methyl-1,3-butadiene, 1,3-pentadiene, 2-chloro-1,3-butadiene, etc. may be mentioned. Among these, 1,3-butadiene and 2-methyl-1,3-butadiene are preferable, and 1,3-butadiene is most preferable. If the monomer units are less than 75% by weight, the low heat buildup property deteriorates, while if more than 99% by weight, the improvement in the extrudability becomes insufficient, and therefore, these are not preferable.

As the monomer usable for forming the aromatic vinyl monomer unit, for example, styrene, o-methylstyrene, m-methylstyrene, p-methylstyrene, 2,4-dimethylstyrene, o-ethylstyrene, m-ethylstyrene, p-ethylstyrene, p-t-butylstyrene, $\alpha$-methylstyrene, $\alpha$-methyl-p-methylstyrene, o-chlorostyrene, p-chlorostyrene, m-chlorostyrene, p-bromostyrene, 2-methyl-4,6-dichlorostyrene, 2,4-dibromostyrene, vinyl naphthalene, etc. may be mentioned. Among these, styrene is preferable. If the monomer unit is contained in less than 1% by weight, the improvement in the extrudability is insufficient, while if more than 25% by weight, the low heat buildup property is liable to deteriorate.

The monomer usable for forming the polyfunctional vinyl monomer units is used for efficiently forming the gel structure. A compound having at least two, preferably two to four, carbon-carbon double bonds capable of copolymerizing with a conjugated diene monomer is preferably used. For example, diisopropenylbenzene, divinylbenzene, triisopropenylbenzene, trivinylbenzene, or another polyhydric vinyl compound; vinyl acrylate, vinyl methacrylate, allyl methacrylate, or another unsaturated ester compound of an $\alpha,\beta$-ethylenic unsaturated carboxylic acid; diallyl phthalate, triallyl cyanulate, triallyl isocyanulate, triallyl trimellitate, or another unsaturated ester compound of a polyhydric carboxylic acid; ethyleneglycol diacrylate, ethyleneglycol dimethacrylate, propyleneglycol dimethacrylate, or another unsaturated ester compound of a polyhydric alcohol; 1,2-polybutadiene, divinylether, divinylsulfone, N,N'-m-phenyl maleimide, etc. may be mentioned. These may be used alone or in any mixture. Among these, divinylbenzene is preferable. Divinylbenzene includes an ortho-, meta-, and para-form. They may be used alone or may be used in any mixture. The polyfunctional vinyl monomer units may be used in any amounts, but to obtain a cross-linked rubber having a 16 to 70 toluene swelling index and exhibiting the desired mechanical properties, abrasion resistance and low heat buildup property, 0.1 to 1.5% by weight is preferably compounded.

As the monomer usable for forming the other ethylenically unsaturated monomer units, for example an $\alpha,\beta$-ethylenically unsaturated carboxylic acid ester monomer, $\alpha,\beta$-ethylenically unsaturated nitrile monomer, $\alpha,\beta$-ethylenically unsaturated carboxylic acid monomer, $\alpha,\beta$-ethylenically unsaturated carboxylic acid amide monomer, olefinic monomer, etc. may be mentioned. If the other optional ethylenically unsaturated monomer units exceed 20% by weight, cross-linked rubber having the desired mechanical properties, abrasion resistance, and low heat buildup property is difficult to obtain, and therefore, this is not preferable.

The toluene swelling index in the conjugated diene-based rubber gel usable in the first aspect to fifth aspects of the present invention is calculated from the weight of gel, when swelled with toluene, and the weight, when dried, as:

(weight of gel when toluene swelled)/(weight when dried).

Specifically, it is measured as follows: That is, 250 mg of the conjugated diene-based rubber gel is shaken in 25 ml of toluene for 24 hours to be swelled. The swelled gel is centrifugally separated by a centrifugal separator under conditions of a centrifugal force of 400,000 m/sec$^2$ or more, the swelled gel is weighed in the wet state, then dried at 70° C. to a constant weight, then the dried gel is reweighed. The toluene swelling index is calculated from these weighed values by:

(weight of gel in wet state)/(weight of gel after being dried).

The conjugated diene-based rubber gel usable in the first aspect to fifth aspects of the present invention preferably has toluene insolubles of 10% by weight to less than 80% by weight, more preferably 20 to 70% by weight. If the toluene insolubles are less than 10% by weight, the effect of compounding the rubber gel is not sufficiently exhibited, and therefore, this is not preferred. If the toluene insolubles are 80% by weight or more, the mixing processability and mechanical properties drop, and therefore, this is not preferred. The toluene insolubles in the conjugated diene-based rubber gel are obtained by cutting 0.5 g of rubber gel (Wo) into about 1 mm cubes, placing them in a #100 mesh cage (Wg), holding them in toluene at room temperature (25° C.) for 24 hours, lifting them up, then vacuum drying them and measuring the weight after drying (W). The toluene insolubles=(W-Wg)/Wo×100(%) were found from these weighed values.

The production method of a conjugated diene-based rubber gel used in the first aspect to fifth aspects of the present invention is not particularly limited. The gel may be produced by (1) using a cross-linkable monomer and directly polymerizing it by emulsion polymerization, (2) continuing the emulsion polymerization reaction by a high conversion rate, for example, a conversion rate of about 90% by weight or more so as to cause a gel structure to form in the latex particles, (3) cross-linking the diene-based rubber latex particles not having a gel structure produced by emulsion polymerization by a compound having a cross-linking action, (4) emulsifying the organic solvent solution of a rubber polymer obtained by solution polymerization in water in the presence of an emulsifying agent and, before removing the organic solvent or after removing it, cross-linking the emulsified material thus obtained by a compound having a cross-linking action, or another method, but the method of (1) using a cross-linkable monomer and directly polymerizing it by emulsion polymerization is preferable. In this case, the polymerization temperature is 0 to 60° C., preferably 5 to 40° C., more preferably 10 to 30° C. If the temperature is excessively high, the control of the cross-linking becomes difficult, while if low, the productivity is decreased. The polymerization conversion rate is usually 10 to 90%, preferably 50 to 80%, more preferably 60 to 75%. If excessively low, a rubber gel having a predetermined toluene swelling index cannot be obtained, while if excessively high, the cross-linking proceeds and the desired swelling index cannot be obtained, and therefore, the mechanical properties deteriorate.

In the first aspect of the present invention, as the high hardness reinforcing layer extending from the bead along the tire sidewalls, the inventors found that, if combining a specific amount of a conjugated diene-based rubber gel having a toluene swelling index of 16 to 70 and a specific amount of carbon black with a predetermined diene-based rubber, it is possible to maintain a sufficient hardness and flex fatigue of the high hardness reinforced rubber and, while doing so, to greatly improve the fluidity and dimensional stability at the time of extrusion.

In order to give a sufficient hardness to the rubber of the high hardness reinforcing layer in the first aspect of the present invention, it is preferable to add 60 to 120 parts by weight of carbon black to 100 parts by weight of this rubber, which is obtained by adding 40 to 5 parts by weight of the conjugated diene-based rubber gel to a rubber blend of 30 to 85 parts by weight of natural rubber and 0 to 65 parts by weight of aromatic vinyl-diene copolymer rubber. In particular, to prevent the tire heat buildup property and rolling resistance from deteriorating, it is preferable to use a conjugated diene-based rubber gel including 25 to 1% by weight of aromatic vinyl monomer units. The hardness of the high hardness reinforcing rubber is preferably 70 to 99, more preferably 72 to 97. If the hardness is less than 70, the reinforcement is insufficient, while if more than 99, the flexibility as the rubber is lost and the durability deteriorates. Note that this hardness means the value measured based on JIS K6253 type A durometer hardness (ISO 48: 1994).

The rubber composition of the high hardness reinforcing layer according to the first aspect of the present invention must contain the predetermined amount of conjugated diene-based rubber gel having a toluene swelling index of 16 to 70 and 60 to 120 parts by weight of carbon black, compounded thereto. Use of carbon black having a nitrogen absorption specific surface area ($N_2SA$) (note: measured based on ASTM D3037 (ISO 4652: 1981)) of 15 to 155 $m^2/g$, preferably 20 to 150 $m^2/g$, and a DBP adsorption (note: measured based on JIS K6221 (ISO 4656-1: 1991)) of 50 to 150 ml/100 g, preferably 60 to 140 ml/100 g, as this carbon black is preferable for obtaining a high hardness reinforcing rubber extending from the tire bead along the sidewalls.

In the second aspect of the present invention, particularly, the diene-based rubber gel has a large effect, combined with polybutadiene rubber including 90% by weight or more of cis 1,4-structure. When of 20 to 75 parts by weight of the polybutadiene rubber is simply compounded alone, the flex fatigue is improved, but the extrudability is decreased, while if the rubber gel is added thereto, the flex fatigue can be maintained and the extrudability is improved.

In the second aspect of the present invention, the inventors found that, if arranging a rubber composition composed of 20 to 75 parts by weight of polybutadiene rubber containing 90% by weight or more of cis 1,4-structure and 40 to 5 parts by weight of conjugated diene-based rubber gel having a toluene swelling index of 16 to 70 (Note: the total amount of rubber is 100 parts by weight) at the two ends of the tread, cracking of the extruded ends at the time of extrusion, so-called "edge breakage", can be suppressed, the dimensional stability of the tread extrudate can be increased, and the shaping precision of the tire can be improved.

The tire shoulder portion suffers from flex fatigue due to rolling of the tire. In the pneumatic tire of the present invention, to give a sufficient fatigue resistance to the two ends of the tread, it is preferable to provide there a rubber composition composed of a rubber blend of 10 to 60 parts by weight of natural rubber and 20 to 75 parts by weight of polybutadiene rubber including 90% by weight or more of a cis 1,4-structure, into which 40 to 5 parts by weight of a conjugated diene-based rubber gel having a toluene swelling index of 16 to 70 is compounded (Note: the total amount of rubber is 100 parts by weight). Further, to prevent the tire from deteriorating in heat buildup property and rolling resistance, the amount of aromatic vinyl monomer units contained in the gel rubber is preferably 25 to 1% by weight.

According to the third aspect of the present invention, it was found that, in a rubber composition compounding a rubber gel having a toluene swelling index Q of 16 to 70 into a diene-based copolymer rubber having aromatic vinyl monomer units, since the rubber gel is present as a soft rubber phase not containing any filler, the ability to track unevenness on the road surface is improved and, as a result, the frictional force is improved. Further, in compounding this base rubber and rubber gel, when the Tg of the base rubber is in a range of ±10° C. with respect to the Tg of the rubber gel, a synergistic effect can be exhibited even with a relatively small compounding amount of the rubber gel and, as a result, a high wet performance can be achieved.

On the other hand, compounding of the rubber gel into the base rubber tends to cause the abrasion resistance to deteriorate due to the weak bonding strength between the different rubbers (difficulty in co-cross-linking). Therefore, the inventors engaged in intensive studies and, as a result, found that the abrasion resistance depends on the Mooney viscosity of the rubber gel and that, if the rubber gel has a Mooney viscosity $ML_{1+4}$ (100° C.) (Note: measured based on JIS K6300 (ISO 289: 1985)) of 90 or more, a sufficient bonding strength with the base rubber can be obtained and the abrasion resistance will not deteriorate. However, if the Mooney viscosity exceeds 140, the processability with rubber deteriorates, so this is not preferred.

In the third aspect of the present invention, there is provided a tire tread rubber composition containing 20 to 95 parts by weight, preferably 50 to 90 parts by weight, of an aromatic vinyl copolymer-conjugated diene rubber (A), 5 to 50 parts by weight, preferably 10 to 50 parts by weight, of conjugated diene-based rubber gel (B) having a toluene swelling index of 16 to 70, preferably 25 to 50, more preferably 30 to 50, and 0 to 50 parts by weight, preferably 0 to 40 parts by weight, of other optional diene-based rubber (C), the copolymer rubber (A) having a glass transition temperature TgA of −40° C. to −5° C., preferably −40° C. to −15° C., the TgA and the glass transition temperature TgB of the conjugated diene based rubber gel (B) satisfying the above formula (1). Preferably, the conjugated diene-based rubber gel satisfies the above condition and has a Mooney viscosity $ML_{1+4}$ (100° C.) (Note: measured based on JIS K6300) of 90 to 140, more preferably 95 to 135.

If the copolymer rubber (A) has a TgA less than −40° C., it is liable to be inferior in wet performance, and therefore, this is not preferred. Conversely, if higher than −5° C., it is liable to be inferior in abrasion resistance and low heat buildup property, and therefore, this is not preferred. Further, in the present invention, the conjugated diene-based rubber gel (B) must have a TgB in the range of TgA-±10° C., preferably TgA±8° C. If the TgB is less than this temperature range, the rubber is liable to be inferior in wet performance, and therefore, this is not preferred. Conversely, if more than this temperature, it is liable to be inferior in abrasion resistance and low heat buildup property, and therefore this is not preferred. Note that the above glass transition temperature Tg is a value measured based on ASTM D3417.

The conjugated diene-based rubber gel having a toluene swelling index Q of 16 to 70 used in the third aspect of the present invention preferably comprises 48.9 to 98.9% by weight of a conjugated diene monomer unit, 50 to 1% by weight of an aromatic vinyl monomer unit, and 0.1 to 1.5% by weight of a polyfunctional vinyl monomer unit and is used in an amount of 5 to 50 parts by weight based upon 100 parts by weight of the total amount of rubber. If this amount is less than 5 parts by weight, the improvement effect of the wet performance is insufficient, and therefore, this is not preferred, while conversely if more than 50 parts by weight, extra mixing time is taken, and therefore, this is not preferred.

The above conjugated diene monomer unit is as explained above. If the monomer unit is less than 48.9% by weight, the abrasion resistance deteriorates, while if more than 98.9% by weight, the improvement effect of the wet performance becomes insufficient. On the other hand, the above aromatic vinyl monomer unit are as explained above. If the monomer unit is more than 50% by weight, the cross-linked rubber becomes inferior in the abrasion resistance, while if less than 1% by weight, the improvement effect of the wet performance becomes insufficient.

The above polyfunctional vinyl monomer unit is also as explained above. Any amount of the polyfunctional vinyl monomer unit may be used. To obtain cross-linked rubber having a 16 to 70 toluene swelling index and exhibiting the desired mechanical properties, abrasion resistance and low heat buildup property, 0.1 to 1.5% by weight is preferably compounded.

As the aromatic vinyl-conjugated diene copolymer rubber usable in the third aspect of the present invention, for example, styrene-butadiene copolymer rubber (SBR), styrene-isoprene-butadiene copolymer rubber (SIBR), styrene-butadiene-acrylonitrile copolymer rubber (SNBR), etc. may be mentioned. The copolymer rubber is compounded in an amount of 20 to 95 parts by weight, more preferably 25 to 95 parts by weight. If the amount is less than 20 parts by weight, the productivity and abrasion resistance are insufficient, and therefore, this is not preferred. If more than 95 parts by weight, the improvement effect of the wet performance is insufficient, and therefor, this is not preferred.

As the any other diene-based rubber used in the third aspect of the present invention, for example, natural rubber (NR), polyisoprene rubber (IR), various types of butadiene rubber (BR), acrylonitrile-butadiene copolymer rubber (NBR), butyl rubber (IIR), etc. may be mentioned. The above rubber ingredients do not necessarily have to be compounded, but if the amount compounded is more than 50 parts by weight, the improvement effect of the wet performance of the tire tread rubber composition is insufficient, and therefore, this is not preferred.

The tire tread rubber composition of the third aspect of the present invention preferably further contains, based upon 100 parts by weight of the rubber ingredient, 10 to 150 parts by weight of carbon black having a nitrogen absorption specific surface area $N_2SA$ of 70 to 350 m²/g and 0 to 150 parts by weight of silica from the viewpoint of improvement in the wet performance and abrasion resistance.

In the fourth aspect of the present invention, it is found that the silica per se reinforces the rubber, without detracting from the flexibility of the rubber. Therefore, the rubber segments including the silica can smoothly track unevenness on the road surface, exhibit a high resistance force against shear strain received from the road surface and exhibit excellent frictional force on wet surfaces and dry surfaces. On the other hand, it was found that the carbon black etc. generally compounded in rubber strongly bonds with the rubber to form a network of the filler, and therefore, is superior in the reinforcing ability, but detracts from the flexibility of the rubber. From this viewpoint, the inventors found that, if the fraction of the amount of the rubber and silica to the total amount of the rubber, all of the fillers including the silica and the acetone extract is defined as a flexible segment fraction F, a high frictional force is exhibited when the fraction F is:

$$0.6 < F \leq 0.9$$

In addition, the inventors found that, in the case where a rubber composition only satisfy:

$$0.6 < F \leq 0.9,$$

the die swell is large and the extrudability is poor, but if a predetermined amount of rubber gel having a toluene swelling index $Q_i$ of 16 to 70 is compounded, the die swell is decreased and, further, the rubber gel is constantly present as a flexible rubber phase in the rubber, since the rubber gel does not incorporate the filler and thereby synergistically improves the frictional force and can be used for a tire tread.

As the conjugated diene-based rubber gel having a toluene swelling index of 16 to 70 used in the fourth aspect of the present invention, rubber gel composed of 48.9 to 98.9% by weight of a conjugated diene monomer unit, 50 to 1% by weight of an aromatic vinyl monomer unit, and 0.1 to 1.5% by weight of a polyfunctional vinyl monomer unit is preferably used. This is used in a compounded amount of 5 to 50 parts by weight. If the compounded amount is less than 5 parts by weight, the improvement effect of the die swell is insufficient, and therefore, this is not preferred. Conversely, if more than 50 parts by weight, extra mixing time is necessary, and therefore, this is not preferred.

The conjugated diene monomer unit is as described above. If the monomer unit is less than 48.9% by weight, the abrasion resistance deteriorates, while if more than 98.9% by weight, the processability and the improvement effect of the frictional force are insufficient. The aromatic vinyl monomer unit is as described above. If the monomer unit is more than 50% by weight, cross-linked rubber is inferior in abrasion resistance, while if less than 1% by weight, the processability and the improvement effect of the frictional force are insufficient.

The polyfunctional vinyl monomer unit is also as explained above. The polyfunctional vinyl monomer unit is preferably used in an amount of 0.1 to 1.5% by weight to obtain a cross-linked rubber exhibiting the desired mechanical properties, abrasion resistance and low heat buildup property.

As the sulfur vulcanizable rubber mainly composed of a copolymer of a conjugated diene and aromatic vinyl used in the fourth aspect of the present invention, for example, a styrene-butadiene copolymer rubber (SBR), styrene-isoprene-butadiene copolymer rubber (SIBR), styrene-butadiene-acrylonitrile copolymer rubber (SNBR), etc. may be mentioned. The above-mentioned sulfur vulcanizable rubber is compounded in an amount of 50 to 95 parts by weight, more preferably 55 to 90 parts by weight. If the amount less than 50 parts by weight, extra mixing time becomes necessary, and therefore, this is not preferred. If more than 95 parts by weight, the improvement effect of the die swell is insufficient, and therefore, this is not preferred.

The tire tread rubber composition of the fourth aspect of the present invention preferably contains, based upon 100 parts by weight of the rubber ingredient, in addition to 10 to 150 parts by weight of silica filler, 1 to 8 parts by weight of a carbon black filler having a nitrogen absorption specific surface area ($N_2SA$) of 70 to 350 $m^2/g$ from the viewpoint of improving the wet performance, abrasion resistance, etc.

In the fifth aspect of the present invention, the inventors found that by compounding a specific rubber gel into the undertread rubber composition, the unvulcanized viscosity is decreased, the heat buildup property at the time of extrusion is decreased, and the extrusion shrinkage is decreased and whereby the present invention has been completed. This is optimal for the intended improvement in the processability of the undertread. Further, physical properties in the direction for improving the modulus can be ideally obtained.

The rubber composition usable for the undertread of a pneumatic tire according to the fifth aspect of the present invention uses, as the rubber ingredient, (i) natural rubber (NR) and/or polyisoprene rubber (IR) in an amount of 50% by weight or more, preferably 50 to 80% by weight, of the entire rubber ingredient, (ii) other optional diene-based rubbers, for example, various types of polybutadiene (BR) and various types of styrene-butadiene copolymer rubber (SBR), in an amount of 0 to 45% by weight of the entire rubber and (iii) a conjugated diene-based rubber gel in an amount of 5 to 30% by weight, preferably 10 to 20% by weight of the entire rubber. If the amount of the NR and/or IR is too small, the tack is unpreferably decreased. If the amount of the conjugated diene-based rubber gel is too small, the improvement effect of the processability is not sufficiently expressed, and therefore, this is not preferred. Conversely, if the amount is too large, the elongation of the vulcanized rubber is decreased etc., and therefore, this is not preferred.

The conjugated diene-based rubber gel usable in the fifth aspect of the present invention has a toluene swelling index of 16 to 70, preferably 20 to 65, more preferably 20 to 40. If the conjugated diene-based rubber gel has a smaller toluene swelling index, the Mooney viscosity of the rubber composition containing a reinforcing agent is increased and the processability and elongation of the vulcanized rubber are decreased. Further, conversely if this index is large, the elongation of the vulcanized rubber is decreased.

The conjugated diene-based rubber gel usable in the fifth aspect of the present invention preferably comprises 48.5 to 99% by weight of a conjugated diene monomer unit, 50 to 1% by weight of an aromatic vinyl monomer unit and 0 to 1.5% by weight of a polyfunctional vinyl monomer unit.

The conjugated diene monomer unit is as described above. If the monomer unit is less than 48.5% by weight, the low heat buildup property deteriorates, while if more than 99% by weight, the improvement effect of the extrudability becomes insufficient. The aromatic vinyl monomer unit is also as explained above. If the monomer unit is more than 50% by weight, the low heat buildup property deteriorates, while if less than 1% by weight, the improvement effect of the extrudability becomes insufficient.

In the conjugated diene-based rubber gel usable in the fifth aspect of the present invention, it is preferable to use a polyfunctional monomer having a cross-linking action, to efficiently form the gel structure. The polyfunctional monomer is also as explained above and is a compound having at least two, preferably two to four carbon-carbon double bonds capable of copolymerizing with a conjugated diene monomer.

The polyfunctional monomer having the cross-linking action mainly forms a gel structure in the conjugated diene-based rubber particles at the time of the polymerization reaction and is used to suitably adjust the toluene swelling index of the conjugated diene-based rubber gel. Usually, it is used in an amount, based upon the entire monomer, of 1.5% by weight or less, preferably 0.1 to 1% by weight, more preferably 0.1 to 0.5% by weight, particularly preferably 0.2 to 0.4% by weight.

The conjugated diene-based rubber gel usable in the fifth aspect of the present invention, as explained above, is preferably a styrene-butadiene copolymer rubber gel using 1,3-butadiene as the monomer for forming the conjugated diene monomer units and styrene as the monomer for forming the aromatic vinyl monomer units. The content of the styrene is preferably 5 to 30% by weight, more preferably 5 to 25% by weight, still more preferably 5 to 20% by weight for improving the extrudability.

The undertread rubber composition according to the fifth aspect of the present invention preferably has a dynamic modulus E' of 6 MPa or more for improving the steering stability, more preferably 7 MPa or more. Note that this dynamic modulus E' means the value measured according to ISO 6721-4: 1994.

The rubber composition according to the first aspect to fifth aspect of the present invention may further contain any necessary reinforcing filler, vulcanization or cross-linking agent, vulcanization or cross-linking accelerator, various types of oils, antiaging agent, filler, softening agent, plasticizer, or other various types of additives blended in for tire use. The compounding amounts of these additives may be made the general amounts insofar as not running counter to the object of the present invention.

EXAMPLES

Examples and Comparative Examples will now be illustrated to further explain the present invention, but the scope of the present invention is by no means limited to these Examples.

Examples I-1 to I-4 and Comparative Examples I-1 to I-4

Production of Conjugated Diene-Based Rubber Gel

A pressure resistant reaction vessel was charged with 180 parts by weight of water, 4 parts by weight, in total, of heterogeneous (or nonuniform) potassium rosinate and sodium salt of a fatty acid as an emulsifying agent, 0.1 part by weight of potassium chloride, and each monomer and a chain transfer agent (i.e., tertiary dodecyl mercaptan) shown in the following Table I-1. These components were stirred until an inside temperature became 12° C., then 0.1 part by weight of cumen hydroperoxide, 0.15 part by weight of sodium formaldehyde sulfoxylate and 0.04 part by weight of ferric sulfate were added, as a radical polymerization initiator, to start the polymerization reaction. When the polymerization conversion rate was about 50%, an additional chain transfer agent was added as shown in Table I-1. The reaction was continued at 12° C. until the polymerization conversion rate became about 70%, then 0.1 part by weight of diethyl hydroxylamine was added to start the polymerization reaction. Next, the mixture was warmed and the residual monomer was recovered by steam distillation under reduced pressure at about 70° C., then 0.1 part by weight of an antioxidant (IRGANOX 1520L available from Ciba Speciality Chemicals) emulsified with an emulsifying agent was added, based upon 100 parts by weight of the generated copolymer. Next, the latex thus obtained was coagulated by being added to a sodium chloride/sulfuric acid solution. The crumbs produced were taken out, sufficiently rinsed, then dried at 50° C. under reduced pressure to obtain the conjugated diene-based rubber gel.

TABLE I-1

|  | Styrene-butadiene rubber gel I-1 (parts by weight) | Styrene-butadiene rubber gel I-2 (parts by weight) | Styrene-butadiene rubber gel I-3 (parts by weight) | Polybutadiene rubber gel I-1 (parts by weight) |
|---|---|---|---|---|
| 1,3-Butadiene | 85 | 92.7 | 93.4 | 99.7 |
| Styrene | 14.7 | 7 | 5 | — |
| Divinylbenzene | 0.3 | 0.3 | 1.6 | 0.3 |
| Chain transfer agent | 0.28 | 0.29 | 0.29 | 0.29 |
| Additional chain transfer agent | 0.01 | 0.01 | 0.01 | 0.01 |

Preparation of Test Samples

The compounding ingredients shown in the following Table I-2, except for the sulfur and vulcanization accelerator, were mixed in a 1.7 liter internal Banbury mixer for 5 minutes until the temperature reached 160° C., then discharged to obtain a master batch. The sulfur and vulcanization accelerator were then added and the resultant mixture was mixed by an 8-inch open roll to obtain a rubber composition. A part of this rubber composition was used for a measurement sample of a "die swell test". Next, the remaining rubber composition was press vulcanized in a cylindrical mold having a diameter of 3 cm and a height of 1.2 cm and a de Mattia flex test piece mold having the dimensions described in JIS K 6260 at 160° C. for 30 minutes to prepare test pieces. These were used for a "JIS hardness test" and "crack growth test". The results are shown in Table I-2.

Test Method

1) JIS hardness test: Type A durometer hardness measured according to JIS K 6253 (ISO 48: 1994).

2) Crack growth test: Crack growth measured according to JIS K 6260 by repeated flexing using de Mattia flex tester. The crack growth after 10,000 flexings at a stroke of 20 mm and a speed of 300±10 rpm was indicated, indexed to Comparative Example 1 as 100. The larger the value, the better.

3) Die swell test: Die swell measured using a Monsanto processability tester under conditions of a temperature of 100° C., L/D=20:1 and shear rate of 100 sec$^{-1}$ (L: capillary length, D: capillary diameter).

TABLE I-2

|  | Comparative Example I-1 | Comparative Example I-2 | Example I-1 | Example I-2 | Comparative Example I-3 | Example I-3 | Example I-4 | Comparative Example I-4 |
|---|---|---|---|---|---|---|---|---|
| Formulation (parts by weight) | | | | | | | | |
| NR[1] | 70 | 70 | 55 | 40 | 67 | 55 | 55 | 55 |
| SBR[2] | 30 | 30 | 30 | 30 | 30 | 30 | 30 | 30 |
| Styrene-butadiene rubber gel I-1[3] | — | — | 15 | 30 | 3 | — | — | — |
| Styrene-butadiene rubber gel I-2[4] | — | — | — | — | — | 15 | — | — |
| Styrene-butadiene rubber gel I-3[5] | — | — | — | — | — | — | — | 15 |
| Polybutadiene rubber gel I-1[6] | — | — | — | — | — | — | 15 | — |
| Carbon black[7] | 70 | 55 | 70 | 70 | 70 | 70 | 70 | 70 |
| Antioxidant[8] | 1 | 1 | 1 | 1 | 1 | 1 | 1 | 1 |
| Zinc white[9] | 5 | 5 | 5 | 5 | 5 | 5 | 5 | 5 |
| Stearic acid[10] | 2 | 2 | 2 | 2 | 2 | 2 | 2 | 2 |
| Process oil[11] | 8 | 8 | 8 | 8 | 8 | 8 | 8 | 8 |
| Vulcanization accelerator[12] | 1.0 | 1.0 | 1.0 | 1.0 | 1.0 | 1.0 | 1.0 | 1.0 |
| Sulfur[13] | 3.0 | 3.0 | 3.0 | 3.0 | 3.0 | 3.0 | 3.0 | 3.0 |

TABLE I-2-continued

|  | Comparative Example I-1 | Comparative Example I-2 | Example I-1 | Example I-2 | Comparative Example I-3 | Example I-3 | Example I-4 | Comparative Example I-4 |
|---|---|---|---|---|---|---|---|---|
| Evaluated physical properties |  |  |  |  |  |  |  |  |
| JIS hardness (type A durometer hardness) | 75 | 65 | 75 | 75 | 75 | 75 | 75 | 75 |
| Crack growth (index) | 100 | 200 | 100 | 100 | 100 | 100 | 100 | 92 |
| Die swell (%) | 65 | 55 | 55 | 52 | 64 | 56 | 62 | 52 |

(Note)
[1] RSS#3
[2] Nipol 1502 (made by Nippon Zeon)
[3] Amount of bound styrene: 12 wt %, amount of divinyl benzene: 0.3 wt %, toluene swelling index: 22, toluene insolubles: 79 wt %
[4] Amount of bound styrene: 5 wt %, amount of divinyl benzene: 0.3 wt %, toluene swelling index: 25, toluene insolubles: 78 wt %
[5] Amount of bound styrene: 4 wt %, amount of divinyl benzene: 1.6 wt %, toluene swelling index: 4, toluene insolubles: 92 wt %
[6] Amount of divinyl benzene: 0.3 wt %, toluene swelling index: 23, toluene insolubles: 78 wt %
[7] DIA-HA (made by Mitsubishi Chemical)
[8] Santoflex 6PPD (made by Flexsys)
[9] Zinc Oxide No. 3 (made by Seido Chemical)
[10] Beads Stearic Acid (made by NOF Corporation)
[11] Desolex No. 3 (made by Showa Shell Oil)
[12] Santocure NS (made by Flexsys)
[13] Gold Flower brand oil-containing sulfur powder (made by Tsurumi Chemical)

Examples II-1 to II-4 and Comparative Examples II-1 to II-4

Production of Conjugated Diene-Based Rubber Gel

A pressure resistant reaction vessel was charged with 180 parts by weight of water, a total of 4 parts by weight of heterogeneous potassium rosinate and sodium salt of a fatty acid, as an emulsifying agent, 0.1 part by weight of potassium chloride, and each monomer and a chain transfer agent (i.e., tertiary dodecyl mercaptan) shown in the following Table II-1. These ingredients were stirred until an inside temperature reached 12° C., then 0.1 part by weight of cumen hydroperoxide, 0.15 part by weight of sodium formaldehyde sulfoxylate and 0.04 part by weight of ferric sulfate were added, as a radical polymerization initiator, to start the polymerization reaction. When the polymerization conversion rate was about 50%, an additional chain transfer agent was added, as shown in Table II-1. The reaction was continued at 12° C. until the polymerization conversion rate became about 70%, then 0.1 part by weight of diethyl hydroxylamine was added to start the polymerization reaction. Next, the mixture was warmed and the residual monomer was recovered by steam distillation under reduced pressure at about 70° C., then 0.1 part by weight of an antioxidant (Ciba Speciality Chemicals IRGANOX 1520L) emulsified with an emulsifying agent was added, based upon 100 parts by weight of the generated copolymer. Next, the latex thus obtained was coagulated by being added to a sodium chloride/sulfuric acid solution. The crumbs thus produced were taken out, sufficiently rinsed, then dried at 50° C. under reduced pressure to obtain the conjugated diene-based rubber gel.

TABLE II-1

|  | Styrene-butadiene rubber gel II-1 (parts by weight) | Styrene-butadiene rubber gel II-2 (parts by weight) | Styrene-butadiene rubber gel II-3 (parts by weight) | Polybutadiene rubber gel II-1 (parts by weight) |
|---|---|---|---|---|
| 1,3-butadiene | 92.7 | 85 | 93.4 | 99.7 |
| Styrene | 7 | 14.7 | 5 | — |
| Divinylbenzene | 0.3 | 0.3 | 1.6 | 0.3 |
| Chain transfer agent | 0.29 | 0.28 | 0.29 | 0.29 |
| Additional chain transfer agent | 0.01 | 0.01 | 0.01 | 0.01 |

Preparation of Test Sample

The ingredients shown in the following Table II-2, except for the sulfur and vulcanization accelerator, were mixed in a 1.7-liter internal Banbury mixer for 5 minutes until reaching 160° C., then discharged to obtain a master batch. The sulfur and vulcanization accelerator were added and mixed by an 8-inch open roll to obtain a rubber composition. A part of this rubber composition was used for measurement samples for a "die swell test" and "edge breakage test". Next, the remaining rubber composition was press vulcanized in a 15 cm×15 cm×0.2 cm mold at 160° C. for 30 minutes to prepare a test piece (i.e., rubber sheet) which was then used for a "constant strain fatigue test". The results are shown in Table II-2.

Test Methods

1) Constant strain fatigue test: 100% strain was repeatedly given to a No. 3 dumbbell according to JIS K 6270 and the number of times of breakage was measured.

The number of times of breakage was measured by n=6 and the 50% residual probability was found-by-the normal probability distribution from the number of times of breakage. The result was shown, indexed to Comparative Example II-1 as 100. The larger the value, the longer the fatigue life.

2) Die swell test: Die swell measured using a Monsanto processability tester under conditions of a temperature of 100° C., L/D=20:1, and shear rate of 100 $sec^{-1}$ (L: capillary length, D: capillary diameter).

3) Edge breakage test: The above rubber composition was extruded to the wing tips of a 185/65R14 size tire tread and the presence of any edge breakage was investigated. "Large" indicates cracks at the edge of over 5 mm, "Small" indicates cracks of the edge of 0 to 5 mm, and "None" indicates no cracks.

TABLE II-2

|  | Comparative Example II-1 | Comparative Example II-2 | Comparative Example II-3 | Example II-1 | Example II-2 | Comparative Example II-4 | Example II-3 | Example II-4 |
|---|---|---|---|---|---|---|---|---|
| Formulation (parts by weight) | | | | | | | | |
| NR[1] | 50 | 50 | 47 | 30 | 30 | 30 | 30 | 20 |
| BR[2] | 50 | — | 50 | 50 | 50 | 50 | 50 | 50 |
| 1,2-syndiotactic crystal content BR[3] | — | 50 | — | — | — | — | — | — |
| Styrene-butadiene rubber gel II-1[4] | — | — | 3 | 15 | — | — | — | 30 |
| Styrene-butadiene rubber gel II-2[5] | — | — | — | — | 15 | — | — | — |
| Styrene-butadiene rubber gel II-3[6] | — | — | — | — | — | 15 | — | — |
| Polybutadiene rubber gel II-1[7] | — | — | — | — | — | — | 15 | — |
| Carbon black[8] | 60 | 60 | 60 | 60 | 60 | 60 | 60 | 60 |
| Antioxidant[9] | 3 | 3 | 3 | 3 | 3 | 3 | 3 | 3 |
| Wax[10] | 1.0 | 1.0 | 1.0 | 1.0 | 1.0 | 1.0 | 1.0 | 1.0 |
| Zinc White[11] | 3 | 3 | 3 | 3 | 3 | 3 | 3 | 3 |
| Stearic acid[12] | 1 | 1 | 1 | 1 | 1 | 1 | 1 | 1 |
| Process oil[13] | 5 | 5 | 5 | 5 | 5 | 5 | 5 | 5 |
| Vulcanization accelerator[14] | 1.0 | 1.0 | 1.0 | 1.0 | 1.0 | 1.0 | 1.0 | 1.0 |
| Sulfur[15] | 1.5 | 1.5 | 1.5 | 1.5 | 1.5 | 1.5 | 1.5 | 1.5 |
| Evaluated physical properties | | | | | | | | |
| Constant strain fatigue (index) | 100 | 96 | 100 | 100 | 100 | 93 | 100 | 100 |
| Die swell (%) | 53 | 45 | 52 | 45 | 44 | 42 | 48 | 41 |
| Edge breakage | Large | None | Small | None | None | None | Small | None |

(Note)
[1]RSS#3
[2]Nipol 1220 BR (cis content = 98 wt %) (made by Nippon Zeon)
[3]VCR412: 1,2-syndiotactic polybutadiene crystal 12 wt % content BR (cis = 98 wt %)
[4]Amount of bound styrene: 5 wt %, amount of divinyl benzene: 0.3 wt %, toluene swelling index: 25, toluene insolubles: 78 wt %
[5]Amount of bound styrene: 12 wt %, amount of divinyl benzene: 0.3 wt %, toluene swelling index: 22, toluene insolubles: 79 wt %
[6]Amount of bound styrene: 4 wt %, amount of divinyl benzene: 1.6 wt %, toluene swelling index: 4, toluene insolubles: 92 wt %
[7]Divinylbenzene: 0.3 wt %, toluene swell index: 23, toluene insolubles: 78 wt %
[8]Shoblack N339 (made by Showa Cabo)
[9]Santoflex 6PPD (made by Flexsys)
[10]Sanoc (made by Ouchi Shinko Chemical Industrial)
[11]Zinc Oxide No. 3 (made by Seido Chemical)
[12]Beads Stearic Acid (made by NOF Corporation)
[13]Desolex No. 3 (made by Showa Shell Oil)
[14]Santocure NS (made by Flexsys)
[15]Gold Flower brand oil-containing sulfur powder (made by Tsurumi Chemical)

Examples III-1 to III-10 and Comparative Examples III-1 to III-4

Preparation of Conjugated Diene-Based Rubber Gel

A pressure resistant reaction vessel was charged with 180 parts by weight of water, a total of 4 parts by weight of heterogeneous potassium rosinate and sodium salt of a fatty acid, as an emulsifying agent, 0.1 part by weight of potassium chloride and each monomer and chain transfer agent (i.e., tertiary dodecyl mercaptan) shown in the following Table III-1. These ingredients were stirred until an inside temperature reached 12° C., then 0.1 part by weight of cumen hydroperoxide, 0.15 part by weight of sodium formaldehyde sulfoxylate and 0.04 part by weight of ferric sulfate were added, as a radical polymerization initiator, to start the polymerization reaction. When the polymerization conversion rate was about 50%, an additional chain transfer agent was added as shown in Table III-1. The reaction was continued at 12° C. until the polymerization conversion rate became about 70%, then 0.1 part by weight of diethyl hydroxylamine was added to start the polymerization reaction.

Next, the mixture was warmed and the residual monomer was recovered by steam distillation under reduced pressure at about 70° C., then 0.1 part by weight of an antioxidant (Ciba Speciality Chemicals IRGANOX 1520L) emulsified with an emulsifying agent was added based upon 100 parts by weight of the generated copolymer. Next, the latex thus obtained was coagulated by being added to a sodium chloride/sulfuric acid solution. The crumbs produced were taken out, sufficiently rinsed, then dried at 50° C. under reduced pressure to obtain the conjugated diene-based rubber gel.

TABLE III-1

|  | Rubber Gel 1 (parts by weight) | Rubber Gel 2 (parts by weight) | Rubber Gel A (parts by weight) | Rubber gel B (parts by weight) | Rubber Gel C (parts by weight) | Rubber Gel D (parts by weight) |
|---|---|---|---|---|---|---|
| 1,3-butadiene | 54 | 44 | 49 | 54 | 49 | 54 |
| Styrene | 45.75 | 55.75 | 50.75 | 45.75 | 50.86 | 45.86 |
| Divinylbenzene | 0.25 | 0.25 | 0.25 | 0.25 | 0.14 | 0.14 |
| Chain transfer agent | 0.27 | 0.27 | 0.27 | 0.27 | 0.13 | 0.12 |
| Additional chain transfer agent | 0.01 | 0.01 | 0.01 | 0.01 | 0.05 | 0.01 |

Test Methods

1) Wet braking test: 195/65R15 size tires using the different rubber compounds shown in Tables III-2 and III-3 for the treads were fabricated and measured for braking distance from an initial speed of 100 km/h on an asphalt road surface. The results are shown, indexed to Comparative Examples III-1 and III-2 as 100. The larger the value, the shorter the braking distance and the better.

2) Abrasion test: A 1.7 liter Banbury mixer was used to mix the ingredients shown in Table III-3, except for the vulcanization accelerator and sulfur at 160° C. for 5 minutes, then an open roll was used to add and mix the vulcanization accelerator and sulfur to obtain a rubber composition. Next, this rubber composition was press vulcanized in a 15 cm×15 cm×0.5 cm mold at 160° C. for 20 minutes to prepare a test piece which was then measured according to JIS K6264 using a Lambourn abrasion tester. The results are shown, indexed to the amount of abrasion of Comparative Example III-2 as 100. The larger the value, the better the abrasion resistance.

The results are shown in Table III-2 and III-3.

TABLE III-2

|  | Comparative Example III-1 | Comparative Example III-2 | Comparative Example III-3 | Example III-1 | Example III-2 | Example III-3 | Comparative Example III-4 | Example III-4 |
|---|---|---|---|---|---|---|---|---|
| Formulation (parts by weight) | | | | | | | | |
| SBR-1[1] | — | 137.5 | 96.25 | 127.88 | 96.25 | 68.75 | — | 96.25 |
| SBR-2[2] | 96.25 | — | — | — | — | 27.5 | 96.25 | — |
| Rubber gel -1[3] | 30 | — | — | 7 | 30 | 30 | 30 | 30 |
| Rubber gel -2[4] | — | — | 30 | — | — | — | — | — |
| Carbon black[5] | 80 | 80 | 80 | 80 | 80 | 80 | 60 | 60 |
| Silica[6] | — | — | — | — | — | — | 20 | 20 |
| Silane coupling agent[7] | — | — | — | — | — | — | 1.6 | 1.6 |
| Antioxidant[8] | 1 | 1 | 1 | 1 | 1 | 1 | 1 | 1 |
| Zinc White[9] | 3 | 3 | 3 | 3 | 3 | 3 | 3 | 3 |
| Stearic acid[10] | 1 | 1 | 1 | 1 | 1 | 1 | 1 | 1 |
| Process oil[11] | 11.25 | — | 11.25 | 2.62 | 11.25 | 11.25 | 11.25 | 11.25 |
| Vulcanization accelerator[12] | 1.5 | 1.5 | 1.5 | 1.5 | 1.5 | 1.5 | 1.5 | 1.5 |
| Sulfur[13] | 2.0 | 2.0 | 2.0 | 2.0 | 2.0 | 2.0 | 2.0 | 2.0 |
| Wet braking performance (index) | 100 | 104 | 104 | 107 | 112 | 111 | 103 | 110 |

(Notes)
[1] Nipol 9528R (made by Nippon Zeon), containing 27.2 wt % extended oil, Tg = −35° C.
[2] Nipol 1712 (made by Nippon Zeon), containing 27.2 wt % extended oil, Tg = −51° C.
[3] Amount of bound styrene = 37 wt %, amount of divinyl benzene = 0.25 wt %, toluene swelling index = 36, Tg = −31° C., Mooney viscosity = 84, toluene insolubles: 63 wt %
[4] Amount of bound styrene = 48 wt %, amount of divinyl benzene = 0.25 wt %, toluene swelling index = 34, Tg = −19° C., Mooney viscosity = 85, toluene insolubles: 64 wt %
[5] DIAA (made by Mitsubishi Chemical), $N_2SA$ = 142 $m^2/g$
[6] Nipsil AQ (made by Nippon Silica Industry), wet silica
[7] Si69 (made by Degussa)
[8] Santoflex 6PPD (made by Flexsys)
[9] Zinc Oxide No. 3 (made by Seido Chemical)
[10] Beads Stearic Acid (made by NOF Corporation)
[11] Desolex No. 3 (made by Showa Shell Oil)
[12] Santocure NS (made by Flexsys)
[13] Gold Flower brand oil-containing sulfur powder (made by Tsurumi Chemical)

TABLE III-3

|  | Comparative Example III-2 | Example III-5 | Example III-6 | Example III-7 | Example III-8 | Example III-9 | Example III-10 |
|---|---|---|---|---|---|---|---|
| Formulation (parts by weight) | | | | | | | |
| SBR-1[1] | 137.5 | 110 | 110 | 110 | 110 | 96.25 | 110 |
| Rubber gel A[2] | — | 20 | — | — | — | — | — |
| Rubber gel B[3] (=Rubber Gel 1) | — | — | 20 | — | — | — | — |
| Rubber gel C[4] | — | — | — | 20 | — | 30 | 20 |
| Rubber gel D[5] | — | — | — | — | 20 | — | — |
| Carbon black[6] | 80 | 80 | 80 | 80 | 80 | 80 | 40 |
| Silica[7] | — | — | — | — | — | — | 40 |
| Silane coupling agent[8] | — | — | — | — | — | — | 3.2 |
| Antioxidant[9] | 1 | 1 | 1 | 1 | 1 | 1 | 1 |
| Zinc White[10] | 3 | 3 | 3 | 3 | 3 | 3 | 3 |
| Stearic acid[11] | 1 | 1 | 1 | 1 | 1 | 1 | 1 |
| Process oil[12] | — | 7.5 | 7.5 | 7.5 | 7.5 | 7.5 | 7.5 |
| Vulcanization accelerator[13] | 1.5 | 1.5 | 1.5 | 1.5 | 1.5 | 1.5 | 1.5 |
| Sulfur[14] | 2.0 | 2.0 | 2.0 | 2.0 | 2.0 | 2.0 | 2.0 |
| Wet braking performance (index) | 100 | 105 | 105 | 106 | 105 | 108 | 109 |
| Abrasion resistance (index) | 100 | 96 | 98 | 103 | 108 | 103 | 107 |

(Notes)
[1] Nipol 9528R (made by Nippon Zeon), containing 27.2 wt % extended oil, Tg = −35° C.
[2] Rubber gel A: amount of bound styrene = 41 wt %, amount of divinyl benzene: 0.25 wt %, toluene swelling index = 34, Tg = −28° C., Mooney viscosity = 79, toluene insolubles: 65 wt %
[3] Rubber gel B: amount of bound styrene = 37 wt %, amount of divinyl benzene: 0.25 wt %, toluene swelling index = 36, Tg = −31° C., Mooney viscosity = 84, toluene insolubles: 63 wt %
[4] Rubber gel C: amount of bound styrene = 41 wt %, amount of divinyl benzene: 0.14 wt %, toluene swelling index = 34, Tg = −31° C., Mooney viscosity = 105, toluene insolubles: 41 wt %

TABLE III-3-continued

|  | Comparative Example III-2 | Example III-5 | Example III-6 | Example III-7 | Example III-8 | Example III-9 | Example III-10 |
|---|---|---|---|---|---|---|---|

[5] Rubber gel D: amount of bound styrene = 37 wt %, amount of divinyl benzene: 0.14 wt %, toluene swelling index = 42, Tg = −31° C., Mooney viscosity = 135, toluene insolubles: 42 wt %
[6] DIAA (made by Mitsubishi Chemical), $N_2SA$ = 142 $m^2/g$
[7] Nipsil AQ (made by Nippon Silica Industry), wet silica
[8] Si69 (made by Degussa)
[9] Santoflex 6PPD (made by Flexsys)
[10] Zinc Oxide No. 3 (made by Seido Chemical)
[11] Beads Stearic Acid (made by NOF Corporation)
[12] Desolex No. 3 (made by Showa Shell Oil)
[13] Santocure NS (made by Flexsys)
[14] Gold Flower brand oil-containing sulfur powder (made by Tsurumi Chemical)

Examples IV-1 to IV-4 and Comparative Examples IV-1 to IV-4

Production of Conjugated Diene-Based Rubber Gel

A pressure resistant reaction vessel was charged with 180 parts by weight of water, a total of 4 parts by weight of heterogeneous potassium rosinate and sodium salt of a fatty acid as an emulsifying agent, 0.1 part by weight of potassium chloride, and each monomer and chain transfer agent (i.e., tertiary dodecyl mercaptan) shown in the following Table IV-1. These ingredients were stirred until an inside temperature became 12° C., then 0.1 part by weight of cumen hydroperoxide, 0.15 part by weight of sodium formaldehyde sulfoxylate and 0.04 part by weight of ferric sulfate were added, as a radical polymerization initiator, to start the polymerization reaction. When the polymerization conversion rate was about 50%, an additional chain transfer agent was added as shown in Table IV-1. The reaction was continued at 12° C. until the polymerization conversion rate became about 70%, then 0.1 part by weight of diethyl hydroxylamine was added to start the polymerization reaction. Next, the mixture was warmed and the residual monomer was recovered by steam distillation under reduced pressure at about 70° C., then 0.1 part by weight of an antioxidant (Ciba Speciality Chemicals IRGANOX 1520L) emulsified by an emulsifying agent was added based upon 100 parts by weight of the generated copolymer. Next, the latex thus obtained was coagulated by being added to a sodium chloride/sulfuric acid solution. The crumbs thus produced were taken out, sufficiently rinsed, then dried at 50° C. under reduced pressure to obtain the conjugated diene-based rubber gel.

TABLE IV-1

|  | Rubber Gel IV-1 (parts by weight) | Rubber Gel IV-2 (parts by weight) |
|---|---|---|
| 1,3-butadiene | 54 | 54 |
| Styrene | 45.75 | 45.7 |
| Divinylbenzene | 0.25 | 0.3 |
| Chain transfer agent | 0.27 | 0.28 |
| Additional chain transfer agent | 0.01 | 0.01 |

Test Methods

1) Wet braking test: 195/65R15 size tires using the different rubber compounds shown in Table IV-2 for the treads were fabricated and measured for braking distance from an initial speed of 100 km/h on an asphalt road surface. The results are shown, indexed to Comparative Example IV-1 as 100. The larger the value, the shorter the braking distance and the better.

2) Die swell test: A 1.7 liter Banbury mixer was used to mix the ingredients shown in Table IV-2, except the vulcanization accelerator, and sulfur at 160° C. for 5 minutes, then the vulcanization accelerator and sulfur were mixed by an open roll and the result used for a die swell test. The rubber composition of each example was measured for die swell using a Monsanto processability tester under conditions of a temperature of 100° C., L/D=20:1, and shear rate of 100 $sec^{-1}$.

The results are shown in the following Table IV-2.

TABLE IV-2

|  | Comparative Example IV-1 | Comparative Example IV-2 | Comparative Example IV-3 | Example IV-1 | Example IV-2 | Example IV-3 | Comparative Example IV-4 | Example IV-4 |
|---|---|---|---|---|---|---|---|---|
| Formulation (parts by weight) | | | | | | | | |
| SBR[1] | 137.5 | 137.5 | 137.5 | 127.88 | 96.25 | 96.25 | 137.5 | 96.25 |
| Rubber gel IV-1[2] | — | — | — | 7 | 30 | — | — | 30 |
| Rubber gel IV-2[3] | — | — | — | — | — | 30 | — | — |
| Carbon black[4] | 80 | 40 | 40 | 40 | 40 | 40 | 20 | 20 |
| Silica[5] | — | 40 | 40 | 40 | 40 | 40 | 60 | 60 |
| Silane coupling agent[6] | — | 3.2 | 3.2 | 3.2 | 3.2 | 3.2 | 4.8 | 4.8 |
| Antioxidant[7] | 1 | 1 | 1 | 1 | 1 | 1 | 1 | 1 |
| Zinc white[8] | 3 | 3 | 3 | 3 | 3 | 3 | 3 | 3 |
| Stearic acid[9] | 1 | 1 | 1 | 1 | 1 | 1 | 1 | 1 |
| Process oil[10] | — | — | 12.50 | 2.63 | 11.25 | 11.25 | — | 11.25 |
| Vulcanization accelerator[11] | 1.5 | 1.5 | 1.5 | 1.5 | 1.5 | 1.5 | 1.5 | 1.5 |
| Sulfur[12] | 2.0 | 2.0 | 2.0 | 2.0 | 2.0 | 2.0 | 2.0 | 2.0 |
| Acetone extraction[13] (parts by weight) | 40.2 | 41.0 | 54.2 | 41.2 | 41.0 | 41.2 | 41.6 | 41.8 |
| F | 0.45 | 0.63 | 0.60 | 0.63 | 0.63 | 0.63 | 0.72 | 0.72 |

TABLE IV-2-continued

|  | Comparative Example IV-1 | Comparative Example IV-2 | Comparative Example IV-3 | Example IV-1 | Example IV-2 | Example IV-3 | Comparative Example IV-4 | Example IV-4 |
|---|---|---|---|---|---|---|---|---|
| Wet braking performance (index) | 100 | 103 | 99 | 105 | 109 | 107 | 105 | 111 |
| Die swell (%) | 51 | 68 | 60 | 60 | 54 | 51 | 73 | 58 |

(Notes)
[1] Nipol 1712 (made by Nippon Zeon), containing 27.2 wt % extended oil
[2] Amount of bound styrene = 37 wt %, amount of divinyl benzene = 0.25 wt %, toluene swell index = 36, toluene insolubles: 63 wt %
[3] Amount of bound styrene = 37 wt %, amount of divinyl benzene = 0.3 wt %, toluene swell index = 22, toluene insolubles: 78 wt %
[4] SEAST 6 (made by Tokai Carbon)
[5] Nipsil AQ (made by Nippon Silica Industry), wet silica
[6] Si69 (made by Degussa)
[7] Santoflex 6PPD (made by Flexsys)
[8] Zinc Oxide No. 3 (made by Seido Chemical)
[9] Beads stearic acid (made by NOF Corporation)
[10] Desolex No. 3 (made by Showa Shell Oil)
[11] Santocure NS (made by Flexsys)
[12] Gold Flower brand oil-containing sulfur powder (made by Tsurumi Chemical)
[13] Measured based on Method A of JIS K 6229 (Soxhlet extraction method).

Examples V-1 to V-2 and Comparative Examples V-1 to V-5

Preparation of Samples

In each of the formulations shown in Table V-1, the ingredients other than the vulcanization accelerator and sulfur were mixed in a 1.8 liter internal mixer for 3 to 5 minutes until reaching 165±5° C., then discharged to obtain a master batch. The vulcanization accelerator and sulfur were mixed in this master batch by an 8-inch open roll to obtain a rubber composition.

Each rubber composition obtained was measured for unvulcanized physical properties (Mooney viscosity). Next, this composition was press vulcanized by a 15×15×0.2 cm mold at 160° C. for 20 minutes to prepare a test piece (rubber sheet) which was then evaluated for vulcanized physical properties. The results are shown in Table V-1.

The test methods for the unvulcanized physical properties and vulcanized physical properties of the compositions obtained in the different examples were as follows:

Evaluation Test Method

E' (dynamic modulus): The dynamic modulus at 20° C. was measured using a spectrometer for measurement of dynamic viscoelasticity made by Iwamoto Seisakusho at an initial strain of 10%, a dynamic strain of ±2% and a frequency of 20 Hz.

Mooney viscosity: Measured according to JIS K6300(ISO 289: 1985) by an L-type rotor at 100° C.

Die swell: Die swell measured using a Monsanto processability tester (MPT) under conditions of a temperature of 100° C., L/D=20, and shear rate of 100 sec$^{-1}$.
L indicates the die length and D the die diameter.

Extrudability: Extrudability measured by Mooney viscosity, die swell, and undergauge. The lower the Mooney viscosity, the lower the die swell, and the lower the undergauge, generally the better the extrudability. Evaluated as Very good: ++, Good: +, and Poor: −.

Steering stability: Vehicle organoleptic test by test driver on dry road (conditions: tire size: 195/65R15, average of vehicle feel by two test drivers). Evaluated as Good: +, Somewhat Poor: ±, and Poor: −.

TABLE V-1

|  | Example V-1 | Example V-2 | Comparative Example V-1 | Comparative Example V-2 | Comparative Example V-3 | Comparative Example V-4 | Comparative Example V-5 |
|---|---|---|---|---|---|---|---|
| Formulation (parts by weight) | | | | | | | |
| RSS#3 | 55 | 55 | 70 | 70 | 55 | 67 | 55 |
| SBR | 15 | 15 | 15 | 15 | 15 | 15 | 15 |
| BR | 15 | 15 | 15 | 15 | 15 | 15 | 15 |
| Rubber gel V-1 | 15 | — | — | — | 15 | 3 | — |
| Rubber gel V-2 | — | 15 | — | — | — | — | — |
| Rubber gel V-3 | — | — | — | — | — | — | 15 |
| Carbon N339 | 60 | 60 | 60 | 60 | 60 | 60 | 60 |
| Aromatic oil | 5 | 5 | 5 | 5 | 5 | 5 | 5 |
| Zinc white | 3 | 3 | 3 | 3 | 3 | 3 | 3 |
| Stearic acid | 2 | 2 | 2 | 2 | 2 | 2 | 2 |
| Antioxidant | 3 | 3 | 3 | 3 | 3 | 3 | 3 |
| Sulfur | 2 | 2 | 2 | 2 | 2 | 2 | 2 |
| Accelerator CBS | 1.5 | 1.5 | 1.5 | 1.5 | 1.5 | 1.5 | 1.5 |
| Undergauge (mm) | 4.0 | 4.0 | 1.0 | 4.0 | 1.0 | 4.0 | 4.0 |
| Evaluation | | | | | | | |
| E' (MPa) | 7.0 | 6.5 | 6.5 | 6.5 | 7.0 | 6.0 | 6.2 |
| Mooney viscosity (ML$_{1+4}$) | 55.0 | 53.0 | 65.0 | 65.0 | 55.0 | 65.0 | 63.0 |
| Die swell (%) | 43.0 | 46.0 | 55.0 | 55.0 | 43.0 | 54.0 | 53.0 |
| Extrudability | + | + | + | − | + | − | − |
| Steering stability | + | ± | − | + | − | + | ± |

Table V-1 notes
RSS#3: Natural rubber

TABLE V-1-continued

|  | Example V-1 | Example V-2 | Comparative Example V-1 | Comparative Example V-2 | Comparative Example V-3 | Comparative Example V-4 | Comparative Example V-5 |
|---|---|---|---|---|---|---|---|

SBR: Nipol 1502 (styrene butadiene copolymer rubber made by Nippon Zeon)
BR: Nipol 1220 (polybutadiene made by Nippon Zeon)
Rubber gel V-1: SBR, amount of bound styrene 12 wt %, amount of divinyl benzene 0.3 wt %, toluene swelling index 22, toluene insolubles: 79 wt %
Rubber gel V-2: SBR, amount of bound styrene 5 wt %, amount of divinyl benzene 0.3 wt %, toluene swelling index 25, toluene insolubles: 78 wt %
Rubber gel V-3: SBR, amount of bound styrene 4 wt %, amount of divinyl benzene 1.6 wt %, toluene swelling index 4, toluene insolubles: 92 wt %

Note that the toluene swelling index and toluene insolubles were determined by the methods explained above.

The Rubber Gel V-1 to Rubber Gel V-3 were produced by the methods described below.

Preparation of Rubber Gel V-1 to Rubber Gel V-3

A pressure resistant reaction vessel was charged with 180 parts by weight of water, a total of 4 parts by weight of heterogeneous potassium rosinate and sodium salt of a fatty acid, as an emulsifying agent, 0.1 part by weight of potassium chloride, and monomers (parts by weight) and a chain transfer agent. (t-dodecyl mercaptan) (parts by weight) shown in Table V-2. The mixture was stirred and raised to an internal temperature of 12° C., then 0.1 part by weight of cumen hydroperoxide, 0.15 part by weight of sodium formaldehyde sulfoxylate and 0.04 part by weight of ferric sulfate were added, as a radical polymerization initiator, to start the polymerization reaction. When the polymerization conversion rate reached about 50%, an additional chain transfer agent (i.e., t-dodecyl mercaptan) was added as in Table V-2. When the polymerization conversion rate reached about 70%, the reaction was continued at 12° C., then 0.1 part by weight of diethyl hydroxylamine was added to start the polymerization reaction.

Next, the mixture was warmed and the residual monomer was recovered by steam distillation under reduced pressure at about 70° C., then 0.1 part by weight of an antioxidant (Ciba Speciality Chemicals IRGANOX 1520L) emulsified by an emulsifying agent was added based upon 100 parts by weight of the generated copolymer. Next, the latex obtained was coagulated by being added to a sodium chloride/sulfuric acid solution. The crumbs produced were taken out, sufficiently rinsed, then dried at 50° C. under reduced pressure to obtain the Rubber Gel V-1 to Rubber Gel V-3.

TABLE V-2

|  | Rubber Gel V-1 | Rubber Gel V-2 | Rubber Gel V-3 |
|---|---|---|---|
| 1,3-butadiene | 85 | 92.7 | 93.4 |
| Styrene | 14.7 | 7 | 5 |
| Divinylbenzene | 0.3 | 0.3 | 1.6 |
| Chain transfer agent | 0.28 | 0.29 | 0.29 |
| Additional chain transfer agent | 0.01 | 0.01 | 0.01 |

Aromatic oil: Desolex No. 3 made by Showa Shell Oil
Zinc white: Zinc Oxide No. 3 made by Seido Chemical
Stearic acid: Made by NOF Corporation
Antioxidant: Antioxidant Santoflex 6PPD made by Flexsys
Sulfur: Gold Flower brand oil-containing sulfur powder made by Tsurumi Chemical
Accelerator CBS: Santocure CZ made by Flexsys

INDUSTRIAL APPLICABILITY

As explained above, according to the first aspect of the present invention, it is possible to greatly improve the fluidity and dimensional stability at the time of extrusion, while maintaining a sufficient hardness and flex fatigue of the high hardness reinforcing rubber. Further, according to the second aspect of the present invention, it is possible to obtain a pneumatic tire, while maintaining the flex fatigue at the two ends of the tire tread, having improved extrudability and extrusion dimensional stability. Further, the rubber composition according to the third aspect of the present invention is superior in braking performance. Further, as shown in Table III-3, when selecting and compounding rubber gel having a specific Mooney viscosity, the rubber composition of the present invention can maintain excellent braking performance and increase the abrasion resistance. Further, according to the fourth aspect of the present invention, it is possible to obtain a rubber composition having excellent wet braking performance and reduced die swell. Further, according to the fifth aspect of the present invention, it is possible to obtain a rubber composition having a high elasticity and improved processability. In this way, according to the present invention, for example, it is possible to put these characteristics to effective use for various types of members of pneumatic tires.

The invention claimed is:

1. A tire tread rubber composition comprising 20 to 95 parts by weight of an aromatic vinyl-conjugated diene copolymer rubber (A), 5 to 50 parts by weight of a conjugated diene-based rubber gel (B) having a toluene swelling index of 16 to 70 and 0 to 50 parts by weight of another diene-based rubber (C), wherein the total weight of rubber is 100 parts by weight and wherein the copolymer rubber (A) has a glass transition temperature TgA (° C.) of −40° C. to −5° C. and wherein said TgA and TgB satisfy the following formula (2):

$$0 \leq TgA - TgB \leq 8 \qquad (2).$$

2. A tire tread rubber composition as claimed in claim 1, wherein said conjugated diene-based rubber gel has a Mooney viscosity ML $_{1+4}$ (100° C.) of 90 to 140.

3. A tire tread rubber composition as claimed in claim 1, wherein said conjugated diene-based rubber gel includes 48.9 to 98.9% by weight of a conjugated diene monomer unit, 50 to 1% by weight of an aromatic vinyl monomer unit and 0.1 to 1.5% by weight of a polyfunctional vinyl monomer unit.

4. A tire tread rubber composition as claimed in claim 1, wherein said rubber composition further contains 10 to 150 parts by weight of carbon black having a nitrogen absorption specific surface area $N_2SA$ of 70 to 350 m$^2$/g and 0 to 150 parts by weight of silica.

* * * * *